United States Patent
Spinnler et al.

(10) Patent No.: US 10,507,697 B2
(45) Date of Patent: Dec. 17, 2019

(54) METHOD FOR DETERMINING THE TEMPERATURE OF AN INTERNAL PART OF THE MATERIALS OF A TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Olivier Spinnler, Clermont-Ferrand (FR); Philippe Dondey, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 198 days.

(21) Appl. No.: 15/543,000

(22) PCT Filed: Mar. 21, 2016

(86) PCT No.: PCT/FR2016/050616
§ 371 (c)(1),
(2) Date: Jul. 12, 2017

(87) PCT Pub. No.: WO2016/151226
PCT Pub. Date: Sep. 29, 2016

(65) Prior Publication Data
US 2018/0015793 A1    Jan. 18, 2018

(30) Foreign Application Priority Data

Mar. 24, 2015   (FR) ...................................... 15 52412

(51) Int. Cl.
*B60C 23/04* (2006.01)
*B60C 23/20* (2006.01)
*B60C 23/06* (2006.01)

(52) U.S. Cl.
CPC .......... *B60C 23/20* (2013.01); *B60C 23/0476* (2013.01); *B60C 23/0498* (2013.01); *B60C 23/0493* (2013.01); *B60C 23/061* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| 6,044,313 A | 3/2000 | Gannon .......................... 701/29 |
| 7,075,421 B1 | 7/2006 | Tuttle ............................ 340/449 |

(Continued)

FOREIGN PATENT DOCUMENTS

| DE | 39 06 399 A1 | 9/1990 |
| DE | 10 2004 040 756 A1 | 8/2005 |

(Continued)

OTHER PUBLICATIONS

International Search Report issued by WIPO dated June 13, 2016, in connection with International Application No. PCT/FR2016/050616 (with English translation attached).

(Continued)

*Primary Examiner* — Andre J Allen
(74) *Attorney, Agent, or Firm* — Venable LLP

(57) ABSTRACT

A method for evaluating the thermal stresses associated with the use of a tire mounted on a rim, the method comprising the steps during which a temperature of a gaseous fluid contained in an internal cavity of the tire, and a temperature of the rim, are measured at regular time intervals, and a temperature at at least one internal zone of the materials of which the tire is made is estimated using a pre-established law connecting this temperature to the temperature of the gaseous fluid contained in the internal cavity of the tire and to the temperature of the rim.

15 Claims, 2 Drawing Sheets

(58) Field of Classification Search
CPC ...... G01M 17/024; G01M 17/10; G01M 7/08;
G01M 17/0076; G01M 17/013; G01M
17/03; G01M 17/04; G01M 17/06; G01M
17/08; G01M 1/02; G01M 1/045; G01M
1/12; G01M 1/225; G01M 3/04; G01M
3/40; G01M 5/0091; G01M 7/02; G01M
99/00; G01M 99/002; H01L 2924/00;
H01L 2224/48247; H01L 2224/73265;
H01L 2224/97; H01L 2924/00012; H01L
2224/32145; H01L 2224/32245; H01L
2924/00014; H01L 2224/2919; H01L
2924/0002; H01L 2924/12044; H01L
2924/13091; H01L 2924/14; H01L
2924/1461; H01L 2924/15788; H01L
2924/181; H01L 2224/05599; H01L
2224/45099; H01L 2224/83; H01L
2224/85; H01L 2924/0665; H01L
21/02118; H01L 21/02175; H01L
21/02183; H01L 21/02186; H01L
21/02189; H01L 21/54; H01L 21/561;
H01L 2224/05554; H01L 2224/48149;
H01L 2224/49174; H01L 2224/4941;
H01L 23/04; H01L 23/3107; H01L
23/49551; H01L 23/49575; H01L 24/09;
H01L 24/48; H01L 24/49; H01L 24/73;
H01L 24/93; H01L 24/97; H01L 25/03;
H01L 25/50; H01L 27/20; H01L
2924/16151; H01L 35/34; H01L 41/25;
H01L 41/311; H01L 41/313; B60C
23/0494; B60C 23/04; B60C 23/0493;
B60C 2019/004; B60C 19/00; B60C
23/0498; B60C 23/064; B60C 23/0488;
B60C 23/0496; B60C 23/0408; B60C
23/041; B60C 23/0411; B60C 23/20;
B60C 11/243; B60C 11/246; B60C 23/06;
B60C 23/061; B60C 23/00; B60C
23/0486; B60C 11/0083; B60C 13/003;
B60C 2009/2038; B60C 23/003; B60C
23/004; B60C 23/02; B60C 23/0401;
B60C 23/0406; B60C 23/0416; B60C
23/0433; B60C 23/0455; B60C 23/0489;
B60C 23/0491; B60C 25/002; B60C
25/005; B60C 25/007; B60C 29/02; B60C
3/04; B60C 99/00; B60C 99/006; B60C
11/24; B60C 13/001; B60C 13/02; B60C
15/0036; B60C 17/02; B60C 2009/0071;
B60C 2009/2022; B60C 2200/02; B60C
2200/06; B60C 2200/065; B60C 23/001;
B60C 23/007; B60C 23/008; B60C
23/0413; B60C 23/0427; B60C 23/0447;
B60C 23/0454; B60C 23/0459; B60C
23/0462; B60C 23/0467; B60C 23/0471;
B60C 23/0472; B60C 23/0474; B60C
23/0476; B60C 23/0484; B60C 23/065;
B60C 23/066; B60C 23/10; B60C
25/0548; B60C 25/056; B60C 25/132;
B60C 25/138; B60C 25/18; B60C 29/005;
B60C 9/005; B60C 9/18; B60C 9/1807;
B60C 9/20; B60C 9/28
USPC .................................................. 73/146–146.8
See application file for complete search history.

(56) References Cited

U.S. PATENT DOCUMENTS

| 7,299,692 | B1 | 11/2007 | Contreras et al. | 73/146 |
| 7,338,201 | B2* | 3/2008 | Shepherd | B60C 23/20 374/1 |
| 2004/0261511 | A1* | 12/2004 | Shepherd | B60C 23/20 73/146 |
| 2010/0319446 | A1 | 12/2010 | Coue | 73/146 |

FOREIGN PATENT DOCUMENTS

| FR | 2 898 679 A1 | 9/2007 |
| WO | WO 2008/046766 A1 | 4/2008 |
| WO | WO 2008/113382 A1 | 9/2008 |

OTHER PUBLICATIONS

Jun. 13, 2016 International Search Report and Written Opinion in International Patent Appln. No. PCT/FR2016/050616.

* cited by examiner

METHOD FOR DETERMINING THE TEMPERATURE OF AN INTERNAL PART OF THE MATERIALS OF A TIRE

FIELD OF THE INVENTION

The present invention relates to the field of monitoring the performance of tires while running on a vehicle. The invention, although not restricted to this particular use, is particularly concerned with monitoring the tires fitted to civil engineering vehicles such as dumpers carrying heavy loads and running over harsh terrain in quarries or in mines.

RELATED ART

These vehicles usually comprise a steering front axle assembly comprising two steered wheels, and a rear axle assembly, usually rigid, comprising four driven wheels arranged in pairs on each side. An axle assembly being defined as an assembly connecting the vehicle structure with the ground.

Throughput requirements are leading the manufacturers of such vehicles to increase the load-bearing capacity as much as possible. These vehicles are therefore becoming increasingly larger and their total laden weight may reach as high as 600 tonnes. This is accompanied by an increase in the size of the tires, the diameter of which may reach several metres.

However, the limit on the load-bearing capacity of this type of vehicle is usually dictated by the ability of the tires to withstand these high loads while at the same time allowing the vehicle to travel at speeds compatible with the throughput requirements.

The result of this is that the operators of such vehicles are becoming increasingly interested in monitoring and checking parameters liable to alter the performance of the tires, such as the nature of the terrain over which the vehicles is travelling, the inclination and radii of curvature of the paths followed, the running speed, the load transported, the external temperature, the snow cover, etc.

As all of these factors have the effect of altering the temperature of the rubber components that make up the tire.

Further, it is also known that the increase in temperature of these components above and beyond a certain limit over a given period of time may cause degradation of the materials based on rubber compounds and rapid failure of the tire.

Hence, a great many indicators have been proposed in order to inform the operator of the load and speed limits that must not be exceeded.

Document U.S. Pat. No. 6,044,313 thus proposes the calculation, at regular time intervals, of an indicator formed by the product of the load borne and the distance travelled over the period between two measurements, and the provision of an alert when this indicator, also known by the abbreviation of TKPH, exceeds a certain limit. This indicator does, however, have the disadvantage of not being sensitive to the particular conditions experienced by a given tire and of not taking account of the actual running conditions experienced by this tire.

Document FR2898679 proposes to correct this estimate by taking into consideration a vehicle usage parameter such as its steering, the radius of the curves, its inclination, the width of the track, or alternatively a parameter associated with its environment, such as the external temperature, the nature of the terrain, the snow cover. The indicator obtained makes it possible with greater precision to evaluate the state of the stresses, but is not sufficient to assess exactly the limit beyond which the tire would suffer irreversible damage, thereby forcing the operator to determine alert thresholds that take margins of safety into consideration and that penalize the optimal use of his vehicles.

To address this difficulty, document WO2008/046766 suggests placing a temperature sensor in the internal zones of the tire that are most sensitive to heating, such as the ply ends, the tread, or alternatively the lower sidewall, and emitting an alert when the measured temperature exceeds a given limit value. This device is, of course, precise and performs well, but requires the provision of a sensor and the associated transmission means within the material of which the tire is formed, something which may prove to be costly and tricky.

BRIEF DESCRIPTION OF EMBODIMENTS OF THE INVENTION

It is an object of the invention to propose a method for evaluating the thermal stresses associated with the use of a tire based on the measurement, at regular time intervals, of a temperature of a gaseous fluid contained in an internal cavity of the tire and of a temperature at a location on a rim on which the said tire is mounted, and on the estimation of a temperature at at least one internal zone of the materials of which the tire is made using a pre-established law connecting this temperature to the temperature of the gaseous fluid contained in the internal cavity of the tire and to the temperature of the rim.

The temperature of the gaseous fluid contained in the internal cavity of the tire, air as a general rule, changes as a function of the temperature of the means liable to contain this volume of gas, namely the tire itself, and the rim on which it is mounted. Real-time monitoring of the temperature of the internal air and of the rim can be done reliably and at lower cost. This results in a more precise approximation of the temperature of the internal components of which the tire is formed, making it possible to determine more exactly the limits of use of the vehicle on which the said tire is mounted. This evaluation in addition makes it possible to monitor each of the tires individually in its actual operating conditions.

The method according to the invention can also comprise the following features, on their own or in combination:

the pre-established law for estimating the temperature $T_{ZI}$ of the said internal zone of the materials of which the tire is made is a law which is a function of the temperature $T_{AI}$ of the gaseous fluid contained in the internal cavity of the tire and of the temperature $T_J$ at a point on the rim, of the type:

$$T_{ZI} = \alpha_{T_{AI}}^{TZI} \cdot T_{AI} + \alpha_{T_j}^{TZI} \cdot T_j + T_{ZI0}$$

in which, for a given internal zone of a given type of tire, $\alpha_{T_{AI}}^{TZI}$, $\alpha_{T_j}^{TZI}$, $T_{ZI0}$ are coefficients which are determined experimentally.

the temperature of the gaseous fluid contained in the internal cavity of the tire used for estimating the temperature of an internal zone of a material of which the tire is made is a smoothed temperature $T_{AIsmoothed}$ resulting from a weighted mean of the temperatures of the gaseous fluid contained in the internal cavity of the tire, measured over a given time interval.

the smoothed temperature is determined using a pre-established law of the type:

$$T_{AI\ smoothed}(t) = \frac{\sum_{i=1}^{n-1} 1/2(T_{AI_i} \cdot p_i + T_{AI_{i+1}} \cdot p_{i+1}) \cdot (t_{i+1} - t_i)}{\sum_{i=1}^{n-1} \cdot 1/2(p_i + p_{i+1}) \cdot (t_{i+1} - t_i)}$$

in which $T_{AI_i}$ represents the value of the temperature of the gaseous fluid contained in the internal cavity of the tire, measured at the time $t_i$, $p_i$ represents a weighting coefficient $$\left(p_i = 1 - \left(\frac{t - t_i}{T_{INT}}\right)\right),$$

and $T_{INT}$ represents a time interval during which at least two measurements of the temperature of the air contained in the internal cavity of the tire are taken.

the temperature of the gaseous fluid contained in the internal cavity of the tire used for estimating the temperature of an internal zone of the material of which the tire is made is readjusted according to the evaluation of the increase or decrease in the value of the temperature over a given time interval so as to take account of the delay in the change in temperature of the said gaseous fluid contained in the internal cavity of the tire with respect to the temperature of the relevant internal zone of the material of which the tire is made.

at a given time value, the temperature of the gaseous fluid contained in the internal cavity of the tire used for estimating the temperature of the internal zone of a material of which the tire is made is determined by a pre-established law of the type:

$$T_{AIdelay}(t) = T_{AI}(t) + \tau \cdot T_{AI}'(t) \cdot (1 - e^{\Delta t/\tau})$$

in which $T_{AI}'$ represents, at the instant t, the value of the derivative of $T_{AI}$, and in which, for a given internal zone of a given type of tire, $\tau$ represents a period of heat transfer in the relevant internal zone, the value of which is adjusted according to whether the value $T_{AI}(t)$ is increasing or decreasing, $\Delta t$ represents the time between two measurements.

the additional steps are provided during which:
  the value of a pressure of the gaseous fluid contained inside the internal cavity of the tire, and the value of a load borne by the tire, are measured at regular intervals,
  the estimate of the value of the temperature of an internal zone of a material of which the tire is made is corrected as a function of the measured values of the pressure and of the load.

at a given time value, the pre-established law for estimating the temperature $T_{ZI}$ of the said internal zone of the materials of which the tire is made is a law which is a function of the temperature $T_{AI}$ of the gaseous fluid contained in the internal cavity of the tire, of the temperature $T_J$ at a point on the rim, of the pressure P and of the load Z, of the type:

$$T_{ZI} = \alpha_{T_{AI}}^{TZI} \cdot T_{AI} + \alpha_{T_j}^{TZI} \cdot T_j + \alpha_P^{TZI} \cdot P + \alpha_Z^{TZI} \cdot Z + T_{ZI0}$$

in which, for a given internal zone of a given type of tire, $\alpha_{T_{AI}}^{TZI}$, $\alpha_P^{TZI}$, $\alpha_Z^{TZI}$, $T_{ZI0}$ are coefficients which are determined experimentally.

the internal temperature of the materials of which the tire is made which are situated in at least one of the zones of the tire selected from one end of the working ply, a bead, a tread, is estimated.

at each time value, the measured temperature, pressure and load values are transmitted to a remote operator.

the said internal temperature of a material of which the tire is made is transmitted to a remote operator.

an alert is emitted when the said internal temperature of the material of which the tire is made exceeds a given threshold during a given time period.

The invention also provides a device for implementing the method, comprising:
  means of exchanging data with sensors capable of acquiring temperature, load and pressure values that are to be processed,
  at least one computer processing unit, and
  coded instructions allowing the steps of the method to be executed.

The invention finally provides software containing the programmed code elements for running the method when the said software is loaded into a computer processing unit and executed by the said processing unit; this software may take the form of a product recorded on a medium readable by a computer processing unit, containing the programmed code elements.

BRIEF DESCRIPTION OF THE DRAWINGS

The invention will be understood better from reading the appended figures, which are provided by way of examples and are in no way limiting, in which.

DETAILED DESCRIPTION OF EMBODIMENTS OF THE INVENTION

In what follows, the numerical values given by way of example and supporting the description of the invention have been obtained for a Michelin™ tire of type 40.00 R 57 XDR B4. Likewise, in the numerical examples, the temperature values are expressed in degrees Celsius, the pressure values in bar and the load values in (metric) tonnes.

Figure 1:
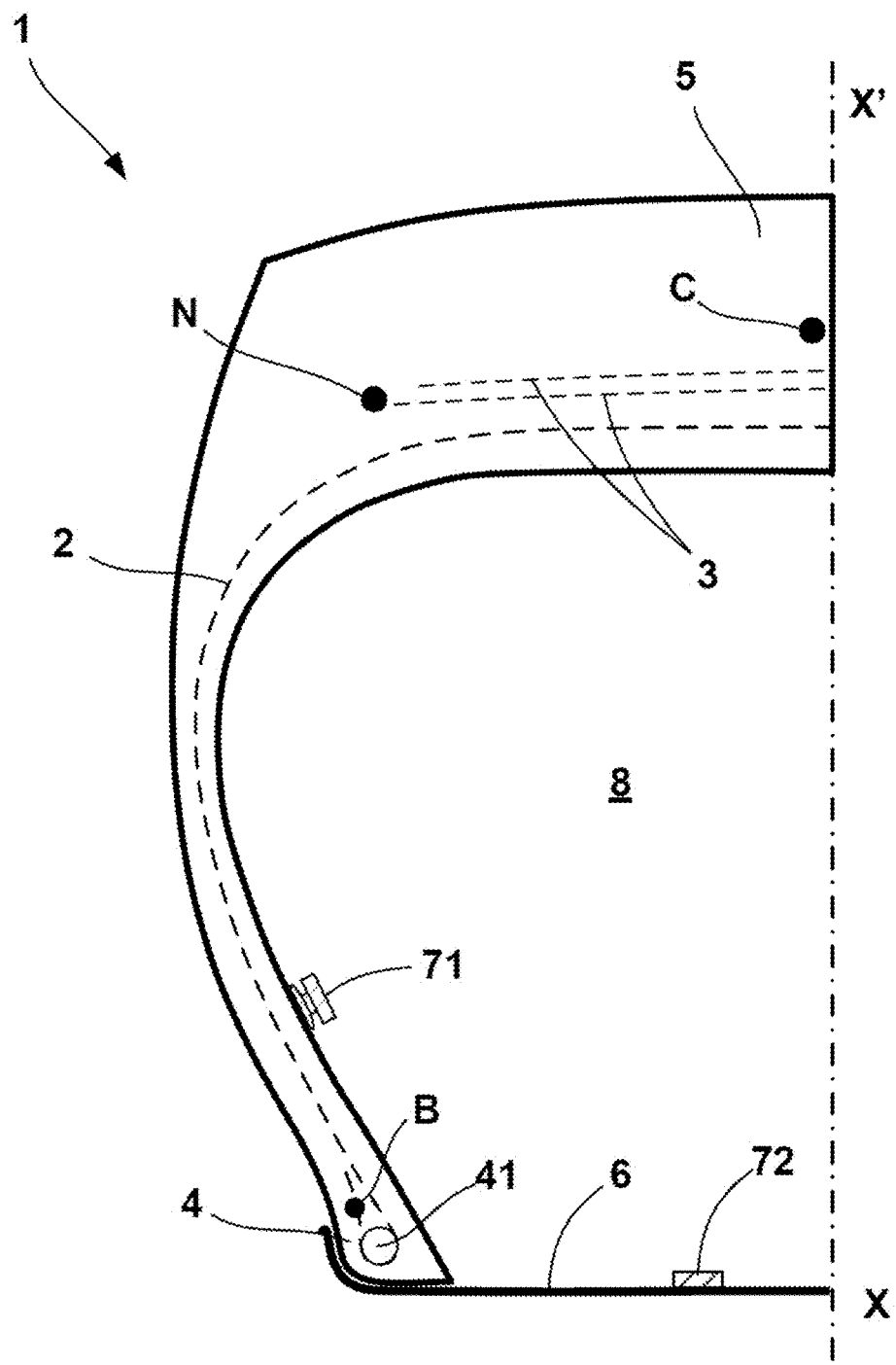
FIG. 1 depicts a schematic view in cross section of a tire mounted on its rim.

The half-section illustrated in FIG. 1 makes it possible to visualize a tire 1 formed of an assembly of rubber-based materials and of reinforcers, generally made of metal, comprising a carcass reinforcing ply 2 joining via its two ends a bead zone 4 where the connection between the tire 1 and the rim 6 is established. In this particular instance, the ply 2 is anchored around a bead wire 41. The crown of the tire comprises a tread 5 the external part of which is intended to come into contact with the ground. This crown part is reinforced by metal plies 3 formed of lengths of individual threads, generally made of metal, coated in rubber and making a given angle with the circumferential direction.

The gaseous fluid is contained in the internal cavity 8 delimited by the internal walls of the tire 1 and of the rim 6.

In the normal mode of use, the tire is inflated with a fluid in the gaseous state. The fluid most commonly used is of course atmospheric air, but it is just as possible to conceive of inflating the tire using nitrogen or an inert gas of greater density so as to limit leaks and the risks of oxidation of the metal reinforcers.

Depending on the running conditions imposed on the tire, certain internal zones are caused to heat up more quickly than others. This is particularly the case of the zone situated at the end N of the reinforcing plies 3, or of the zone C situated at the centre of the tire at the base of the rubber blocks that form the tread pattern, alternatively in the internal zone B of the bead.

The temperature $T_{AP}$ or the pressure, of the internal air contained in the tire is measured in a known way using a device 71 of TPMS (Tire Pressure Monitoring System) type which at regular time intervals estimates the pressure and temperature prevailing inside the internal cavity of the tire. The pressure and temperature values are transmitted by radiofrequency to a receiver situated in the cab of the vehicle, and may also be sent to a remote receiver such as an operational control post in which the means of managing the fleet of vehicles operating in a mine are concentrated.

The sensor 71 may be installed by way of example in the lower part of the internal wall of the sidewall of the tire.

The temperature $T_J$ of the rim 6 may also be measured using a temperature sensor 72. This sensor may be of the same type as the previous one. In the example supported by FIG. 1, the sensor 72 is situated inside the internal cavity 8. It is bonded to a location situated between the two anchor points of the lower part of the tire. This nonlimiting arrangement allows the temperature sensor to be isolated from external attack. However, it is also entirely possible for the sensor 72 to be situated on a part of the rim that is situated on the outside of the internal cavity 8, at a location representative of the exchanges of heat between the air of the internal part and the external air and passing via the rim.

The temperature of the internal air $T_{AI}$ or the temperature of the rim $T_J$ is measured at regular time intervals, for example every minute.

It has been demonstrated that a linear law of the type:

$$T_{ZI} = \alpha_{T_{AI}}^{TZI} \cdot T_{AI} + \alpha_{T_J}^{TZI} \cdot T_J + T_{ZI0} \quad (a)$$

constitutes a good approximation of the relationship between the temperature of the internal air $T_{AI}$, the temperature of the rim $T_J$ and the temperature $T_{ZI}$ of an internal zone ZI of the materials that make up the internal part of the tire and which were mentioned hereinabove.

In this law, $\alpha_{T_{AI}}^{T_{ZI}}$, $\alpha_{T_J}^{T_{ZI}}$, $T_{ZI0}$, are coefficients which are determined experimentally for a given internal zone of a given type of tire.

However, it is found that the temperature values, particularly the value of the temperature of the internal air, may be subject to instantaneous variations which are not generated by an addition of heat energy originating from an increase or decrease in the internal temperature of the components of which the tire is made.

Figure 2:
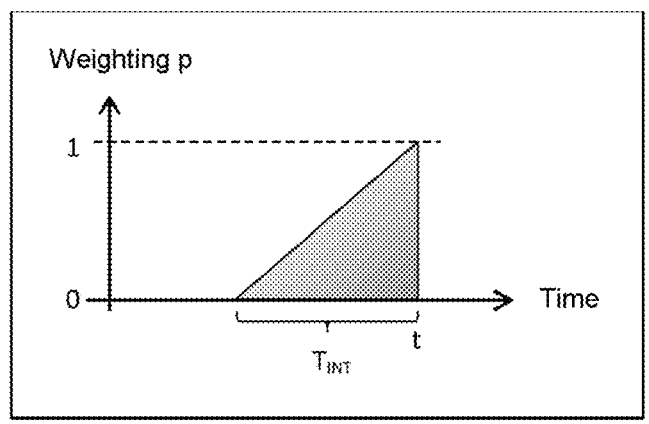
FIG. 2 depicts the way in which a weighting coefficient p, evolves over a time interval $T_{INT}$.

So, it proves to be beneficial to perform a smoothing of these temperature values over a given time period $T_{INT}$, by weighting the temperature values measured during this period by a coefficient $p_i$ that evolves linearly from 0 to 1 over the time interval, as depicted in the diagram in FIG. 2:

$$p_i = 1 - \left(\frac{t - t_i}{T_{INT}}\right) \quad (b)$$

This then gives a smoothed value of the temperature over the time period resulting from the n measurements taken during this period $T_{INT}$, and for which the influence of the oldest measurements decreases.

Thus, by way of example, the value of the temperature of the internal air $T_{AI}$ that is used in calculation formula (a) becomes:

$$T_{AI\,smoothed}(t) = \frac{\sum_{i=1}^{n-1} 1/2(T_{AI_i} \cdot p_i + T_{AI_{i+1}} \cdot p_{i+1}) \cdot (t_{i+1} - t_i)}{\sum_{i=1}^{n-1} \cdot 1/2(p_i + p_{i+1}) \cdot (t_{i+1} - t_i)} \quad (c)$$

The value of this period of smoothing $T_{INT}$ may beneficially be of the order of 30 to 40 minutes.

The value of the temperature of the rim may also form the subject of a smoothing operation using the same weighting coefficient and over the same period of time.

$T_J$ is thus replaced in formula (a) by the value $T_{Jsmoothed}$.

$$T_{Jsmoothed}(t) = \frac{\sum_{i=1}^{n-1} 1/2(T_{J_i} \cdot p_i + T_{J_{i+1}} \cdot p_{i+1}) \cdot (t_{i+1} - t_i)}{\sum_{i=1}^{n-1} \cdot 1/2(p_i + p_{i+1}) \cdot (t_{i+1} - t_i)} \quad (d)$$

Another phenomenon also needs to be taken into consideration in order to improve the reliability of the result obtained, and this stems from the fact that the heat energy generated in an internal zone of a material of which the tire is made takes a certain time to travel to the interior surface and exchange heat with the air contained in the internal cavity of the tire. This phenomenon is known by the name of the delay effect.

Thus, the temperature of the internal air $T_{AI}$ as used in formula (a) is replaced by an imaginary temperature $T_{AIdelay}$ delay obtained as follows:

$$T_{AIdelay}(t) = T_{AI}(t) + \tau \cdot T_{AI}'(t) \cdot (1 - e^{\Delta t/\tau}) \quad (e)$$

in which $T_{AI}$ represents the value of the temperature of the internal air, and preferably the smoothed value of the temperature of the internal air obtained at (d), $T_{AI}'$ represents, at the instant t, the value of the derivative of $T_{AI}$ and in which, for a given type of tire, $\tau$ represents the period of heat transfer in the relevant internal zone, the value of which is adjusted according to whether the value $T_{AI}(t)$ is increasing or decreasing, $\Delta t$ represents the time between two measurements.

The calculation to evaluate the value of the derivative of the temperature at the instant t may be performed easily by looking for a regression straight line of type $y = a + b \cdot t$, in which, for n values $(T_{AI}, t_i)$ from $t - T_{INTD}$ to t, the error:

$$\Sigma_{i=1}^n p_i \cdot (y_i - (a + b \cdot t_i))^2 \quad \text{(f) is minimized.}$$

The regression uses the same type of weighting $p_j$ as that used in (b) for smoothing the temperature data.

The coefficients (a, b) are given by solving the following matrix equation:

$$[a \; b] = ({}^t X_p X)^{-1 \, t} X_p Y \quad (g)$$

with:

$$X = \begin{bmatrix} 1 & t_1 \\ \vdots & \vdots \\ 1 & t_n \end{bmatrix} \quad (h)$$

$$X_p = \begin{bmatrix} p_1 & p_1 \cdot t_1 \\ \vdots & \vdots \\ p_n & p_n \cdot t_n \end{bmatrix} \quad (i)$$

$$Y = \begin{bmatrix} T_{AI1} \\ \vdots \\ T_{AIn} \end{bmatrix} \quad (j)$$

The value of the derivative $T_{AI}'$ at the time t is then given by the coefficient b.

The value of the heat exchange coefficients τ varies according to the sign of the coefficient b in order to take account of the fact that this exchange coefficient is different according to whether the material of which the relevant internal zone ZI is made is heating up or cooling down.

This type of calculation can also be undertaken in order to correct the value of the temperature of the rim.

The time period $T_{INTD}$ may be equivalent to the period $T_{INT}$ used previously for smoothing the temperature, or may be longer. In the case of the study used in support of the present description, the value of $T_{INTD}$ has been set at 40 minutes.

By way of example, for the tire of size 40.00 R 57 XDR B4, the temperature of the materials situated at the edge of the crown reinforcing ply is obtained using the following law:

$$T_{NST} = \alpha_{T_{AI}}^{TNST} \cdot T_{AI} + \alpha_{T_j}^{TNST} \cdot T_j + T_{NST0} \quad (k)$$

in which the temperature $T_{AI}$ of the internal air is a corrected temperature after smoothing and after the delay effect has been taken into consideration, as explained hereinabove, and in which the values of the coefficients have been determined experimentally as follows: $\alpha_{T_{AI}}^{TNST}=1.78$, $\alpha_{T_j}^{TNST}=-0.48$, and $T_{NST0}=-3$. When the value of the temperature is increasing, the value of τ is 300 minutes, and when the value of the temperature is decreasing, the value of τ is 720 minutes.

Figure 3:
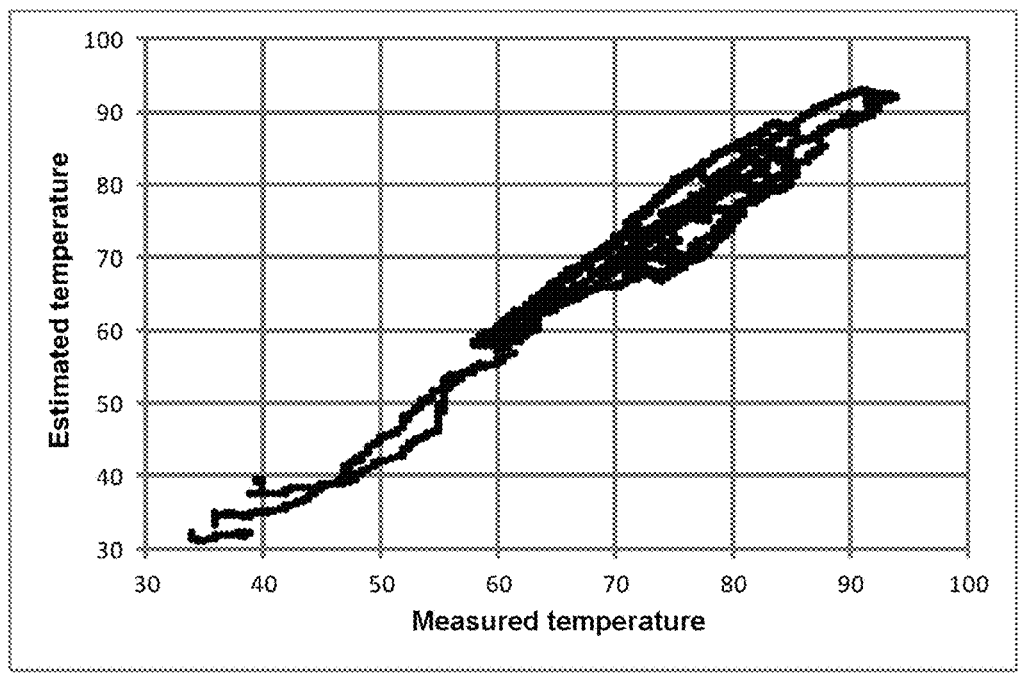
FIG. 3 depicts a diagram that allows the value of the internal temperature of the materials situated at the edges of the end of the crown plies, as estimated using the method according to the invention, to be compared with the temperature in this same interior zone, as measured using an experimental thermocouple inserted into the tire.

FIG. 3 makes it possible to assess the validity of the resulting model, and the spread between the temperature values obtained using the estimation model that forms the subject matter of the invention and the values actually measured at the end of the crown reinforcing plies of a tire mounted on the right front of a site vehicle of dumper type.

For certain internal zones ZI of the materials of which the tire is made, it may prove necessary to introduce additional corrections to the temperature of the gaseous fluid enclosed within the internal cavity of the tire. Such is the case for example when seeking to estimate the temperature at the centre C of the tread, where the impact that the internal pressure (P) and the load (Z) borne by the tire have is not of secondary importance, or alternatively in the zone of the bead B, where the influence of the load (Z) also merits consideration.

The pre-established law for estimating the temperature is therefore of the type:

$$T_{ZI} = \alpha_{T_{AI}}^{TZI} \cdot T_{AI} + \alpha_{T_j}^{TZI} \cdot T_j + \alpha_P^{TZI} \cdot P + \alpha_Z^{TZI} \cdot Z + T_{ZI0} \quad (l)$$

in which $T_{AI}$ represents the value of the temperature of the internal air, and $T_J$ the temperature of the rim. The variable P represents the value of the pressure of the gaseous fluid, and Z represents the load. These values may beneficially also be the subject of a weighted smoothing operation and/or the incorporation of a delay effect as explained hereinabove (d), (e).

$\alpha_{T_{ZI}}^{TZI}$, $\alpha_{T_j}^{TZI}$, $\alpha_P^{TZI}$, $\alpha_Z^{TZI}$ and $T_{ZI0}$, are coefficients determined experimentally for the type of tire considered.

The value of the pressure P is estimated directly using the TPMS sensor used for measuring the temperature of the internal air.

The load Z borne is estimated using means which are also known, such as a pressure sensor inserted in the means of controlling the hydraulic pressure of the suspension arms, or alternatively using a strain gauge installed on the chassis. The unladen weight of the vehicle and the distribution of the load on each of the tires can be evaluated separately using traditional weighing means when the model used as a basis for the method is initialized.

Thus, the law for determining the temperature at the centre C of the tread for the tire of type 40.00 R 57 XDR B4 used as the continuous thread through this description is of the type:

$$T_C = \alpha_{T_{AI}}^{TC} \cdot T_{AI} + \alpha_{T_j}^{TC} \cdot T_j + \alpha_P^{TC} \cdot P + \alpha_Z^{TC} \cdot Z + T_{C0} \quad (m)$$

in which $T_{AI}$ represents the temperature of the internal air after smoothing and the incorporation of the delay effect, $T_J$ represents the temperature of the rim after smoothing, P represents the pressure of the internal air after smoothing, and Z represents the load borne by the tire after smoothing, and in which, $\alpha_{T_{AI}}^{TC}=1.75$; $\alpha_{T_j}^{TC}=-0.48$; $\alpha_P^{TC}=5$, $\alpha_Z^{TC}=-0.4$, and $T_{C0}=-19.8$. When the value of the temperature is increasing, the value of r is 300 minutes, and when the value of the temperature is decreasing, the value of r is 720 minutes.

It will be readily appreciated that all these successive corrections are aimed at minimizing the discrepancy between the temperature derived from the model and the actual temperature measured in the internal zone of a material of which the tire is made, with a view to reducing the number of non-detections or of unfounded alerts.

Also, it may prove to be beneficial, on the basis of a statistical analysis, to adjust the above values of the constants in order to reduce the number of these false decisions and bring them back within limits acceptable to the operator.

Devising the method according to the invention and determining the constants of the model described hereinabove entail a prior experimental phase conducted using analysis means that provide access to the actual temperature values in the zones that are to be monitored. It may therefore prove beneficial to have use of a ready-instrumented tire, so that monitoring can be carried out on vehicles of the same type as those on which this type of tire is intended to be run. And the values derived from this experimental stage can then be exploited for all tires of the same size.

Once the physical model is established, and the laws for estimating the temperature in the internal zones of the materials of which the tire is made that are the most sensitive to an increase in temperature have been determined, it is possible to create software intended to be loaded into a computer processing unit and executed in real-time. This processing unit may be installed in a remote control and monitoring control post in which the means of monitoring the fleet of vehicles operating in a mine are concentrated. This implies that these vehicles are fitted with means allowing real-time transmission of the temperature, load and pressure data to the said computer processing unit using known means and protocols.

The value of the internal temperature $T_{ZI}$ of a material of which the tire is made can be determined directly by a central unit arranged on the civil engineering vehicles or may be performed in the central unit situated in the control post. In which case, upon each measurement, the values of temperature $T_{AI}$, $T_J$ pressure P and load Z are sent from the civil engineering vehicles to the control post where the thermal stresses experienced by each of the tires of the fleet of construction vehicles are monitored and at which the alerts or running instructions are emitted.

The software may beneficially be recorded on a medium such as a disk, a magnetic tape, a USB stick, or in the memory of a remote server so that it can be loaded or downloaded into a central unit following an agreement regarding the commercial transaction relating to said transfer.

Exploitation of the method thus makes it possible to have available precise data regarding the state of the tires and to decide in real-time upon the actions to be undertaken in order not to exceed the temperature thresholds $T_{limitZI_i}$ liable to give rise to irreparable damage to the tires, and in order to optimize the operation of the fleet of vehicles on which these tires are mounted. These temperature thresholds $T_{limitZI_i}$ are determined experimentally and depend on the nature of the materials of which the relevant interior zone ZI, is made. They may be communicated by the tire manufacturers.

For reasons of convenience, an estimator E may also be calculated that gives not the temperature of the internal zone, but a parameter equivalent to a level of stressing and based on the heat level. The form of this indicator, for a given zone of a given tire, is of the type:

$$E = \left(\frac{T_{estimated\ ZI_i} - T_{limit\ ZI_i}}{T_{ambient} - T_{limit\ ZI_i}}\right) \times 100$$

in which $T_{estimatedZIi}$ represents the value of the temperature in the zone $ZI_i$, estimated according to the method indicated hereinabove, and in which $T_{ambient}$ represents the ambient temperature of the external atmospheric air in the zone of operation of the vehicle.

If the estimated temperature is equal to the ambient temperature, the tire is at rest, and the value of E is equal to 0%. If the temperature is equal to the limit defined for the internal zone of the relevant tire, the value displayed is 100%.

When a vehicle is being monitored, it is the indicator $E_{max}$ that has the maximum level that is monitored.

Thus, the method proposed makes it possible to carry out precise monitoring of the thermal stresses experienced by a given tire during operation, using measurement means that are known and inexpensive.

The invention claimed is:

1. A method for evaluating thermal stresses associated with use of a tire mounted on a rim, the method comprising steps of:
    measuring a temperature of a gaseous fluid contained in an internal cavity of the tire at regular time intervals, in order to obtain a fluid temperature ($T_{AI}$);
    measuring a temperature at location on the rim at regular time intervals, in order to obtain a rim temperature ($T_j$);
    determining an estimated temperature ($T_{ZI}$) at at least one internal zone of materials of which the tire is made using a pre-established law connecting the estimated temperature ($T_{ZI}$) to the fluid temperature ($T_{AI}$) and the rim temperature ($T_j$).

2. The method according to claim 1, wherein the pre-established law connecting the estimated temperature ($T_{ZI}$) to the fluid temperature ($T_{AI}$) and the rim temperature ($T_j$) has a formula of:

$$T_{ZI} = \alpha_{T_{AI}}^{TZI} \cdot T_{AI} + \alpha_{T_j}^{TZI} \cdot T_j + T_{ZI0}$$

in which, for a given internal zone of a given type of the tire, $\alpha_{T_{AI}}^{TZI}$, $\alpha_{T_j}^{TZI}$, $T_{ZI0}$ are coefficients that are determined experimentally.

3. The method according to claim 1, wherein the step of measuring the temperature of the gaseous fluid contained in the internal cavity of the tire at the regular time intervals is performed over a given time period, and
    wherein a smoothed temperature ($T_{AIsmoothed}$) determined from a weighted mean of the measured temperatures obtained over the given time period is used to determine the estimated temperature ($T_{ZI}$).

4. The method according to claim 3, wherein the smoothed temperature ($T_{AIsmoothed}$) is determined using a pre-established law having a formula of:

$$T_{AI\ smoothed}(t) = \frac{\sum_{i=1}^{n-1} 1/2(T_{AI_i} \cdot p_i + T_{AI_{i+1}} \cdot p_{i+1}) \cdot (t_{i+1} - t_i)}{\sum_{i=1}^{n-1} \cdot 1/2(p_i + p_{i+1}) \cdot (t_{i+1} - t_i)},$$

in which:
    $T_{AI_i}$ represents a value of a temperature of the gaseous fluid contained in the internal cavity of the tire, measured at a time $t_i$,
    $p_i$ represents a weighting coefficient having a formula of:

$$\left(p_i = 1 - \left(\frac{t - t_i}{T_{INT}}\right)\right),$$

and
    $T_{INT}$ represents a time interval during which at least two measurements of the temperature of the gaseous fluid contained in the internal cavity of the tire are taken.

5. The method according to claim 1, wherein the fluid temperature ($T_{AI}$) used for determining the estimated temperature ($T_{ZI}$) is a delay-adjusted temperature ($T_{AIdelay}$), which is readjusted according to an evaluation of an increase or a decrease in a value of the temperature of the gaseous fluid contained in the internal cavity of the tire over a given time period, so as to take into account a delay-related temperature change of the gaseous fluid contained in the internal cavity of the tire with respect to the estimated temperature ($T_{ZI}$).

6. The method according to claim 5, wherein, at a given time value (t), the delay-adjusted temperature ($T_{AIdelay}$) has a formula of:

$$T_{AIdelay}(t) = T_{AI}(t) + \tau \cdot T_{AI}'(t) \cdot (1 - e^{\Delta t/\tau})$$

in which
    $T_{AI}'$ represents, at a time instant t, a value of a derivative of $T_{AI}(t)$,
    for a given internal zone of a given type of the tire, $\tau$ represents a period of heat transfer, $\tau$ have a value that is adjusted according to whether a value of $T_{AI}(t)$ is increasing or decreasing, and
    $\Delta t$ represents an amount of time between two measurements.

7. The method according to claim 1, further comprising steps of:
    measuring a pressure of the gaseous fluid contained inside the internal cavity of the tire at regular time intervals, in order to obtain a gas pressure (P) in the internal cavity of the tire;

measuring a load borne by the tire at regular intervals, in order to obtain a tire load (Z); and correcting the estimated temperature ($T_{ZI}$) based on the gas pressure (P) and the tire load (Z).

8. The method according to claim 7, wherein, at a given time value (t), the pre-established law connecting the estimated temperature ($T_{ZI}$) to the fluid temperature ($T_{AI}$) and the rim temperature ($T_j$) takes into account the gas pressure (P) and the tire load (Z), and has a formula of:

$$T_{ZI} = \alpha_{T_{AI}}^{TZI} \cdot T_{AI} + \alpha_{T_j}^{TZI} \cdot T_j + \alpha_P^{TZI} \cdot P + \alpha_Z^{TZI} \cdot Z + T_{ZI0}$$

in which, for a internal zone of a given type of the tire, $\alpha_{T_{AI}}^{TZI}$, $\alpha_P^{TZI}$, $\alpha_Z^{TZI}$, $T_{ZI0}$ are coefficients that are determined experimentally.

9. The method according to claim 1, where the estimated temperature ($T_{ZI}$) at at least one internal zone of the materials of which the tire is made is an internal temperature of materials situated at at least one of:

a zone at an end region (N) of a working ply of the tire,
a zone at a bead region (B) of the tire,
a zone at a tread region (C) of the tire.

10. The method according to claim 7, wherein, at each time value (t), values of the fluid temperature ($T_{AI}$), the rim temperature ($T_j$), the gas pressure (P), and the tire load (Z) are transmitted to a remote operator.

11. The method according to claim 1, wherein the estimated temperature ($T_{ZI}$) at at least one internal zone of materials of which the tire is made is transmitted to a remote operator.

12. The method according to claim 1, further comprising a step of emitting an alert when the estimated temperature ($T_{ZI}$) at at least one internal zone of materials of which the tire is made exceeds a given threshold during a given time period.

13. A system for evaluating thermal stresses associated with use of a tire mounted on a rim, the system comprising:
(A) a computer; and
(B) a memory storing executable code that, when executed by a processing unit of the computer, causes the computer to perform a method that includes:
(1) utilizing temperatures of a gaseous fluid contained in an internal cavity of the tire measured at regular time intervals to determine a fluid temperature ($T_{AI}$) in the internal cavity of the tire,
(2) utilizing temperatures at a location on the rim measured at regular time intervals to determine a rim temperature ($T_j$),
(3) calculating an estimated temperature ($T_{ZI}$) at at least one internal zone of materials of which the tire is made using a pre-established law connecting the estimated temperature ($T_{ZI}$) to the fluid temperature ($T_{AI}$) in the internal cavity of the tire and the rim temperature ($T_j$),
wherein the temperatures of the gaseous fluid contained in the internal cavity of the tire, and the temperatures at the location on the rim are transmitted from the tire to the computer.

14. A computer for evaluating thermal stresses associated with use of a tire mounted on a rim, the computer comprising a processing unit programmed with code for at least:
calculating a fluid temperature ($T_{AI}$) in an internal cavity of the tire using temperatures of a gaseous fluid contained in the internal cavity of the tire measured at regular time intervals;
calculating a rim temperature ($T_j$) using temperatures at a location on the rim measured at regular time intervals; and
calculating an estimated temperature ($T_{ZI}$) at at least one internal zone of materials of which the tire is made using a pre-established law connecting the estimated temperature ($T_{ZI}$) to the fluid temperature ($T_{AI}$) in the internal cavity of the tire and the rim temperature ($T_j$).

15. A non-transitory computer-readable storage medium storing code that, when executed by a computer processor, causes the computer processor to perform a method for evaluating thermal stresses associated with use of a tire mounted on a rim, the method comprising steps of:
calculating a fluid temperature ($T_{AI}$) in an internal cavity of the tire using temperatures of a gaseous fluid contained in the internal cavity of the tire measured at regular time intervals;
calculating a rim temperature ($T_j$) using temperatures at a location on the rim measured at regular time intervals; and
calculating an estimated temperature ($T_{ZI}$) at at least one internal zone of materials of which the tire is made using a pre-established law connecting the estimated temperature ($T_{ZI}$) to the fluid temperature ($T_{AI}$) in the internal cavity of the tire and the rim temperature ($T_j$).

* * * * *